E. S. CALDWELL.
STEAM TRAP.
APPLICATION FILED NOV. 5, 1909.
1,081,431.
Patented Dec. 16, 1913.
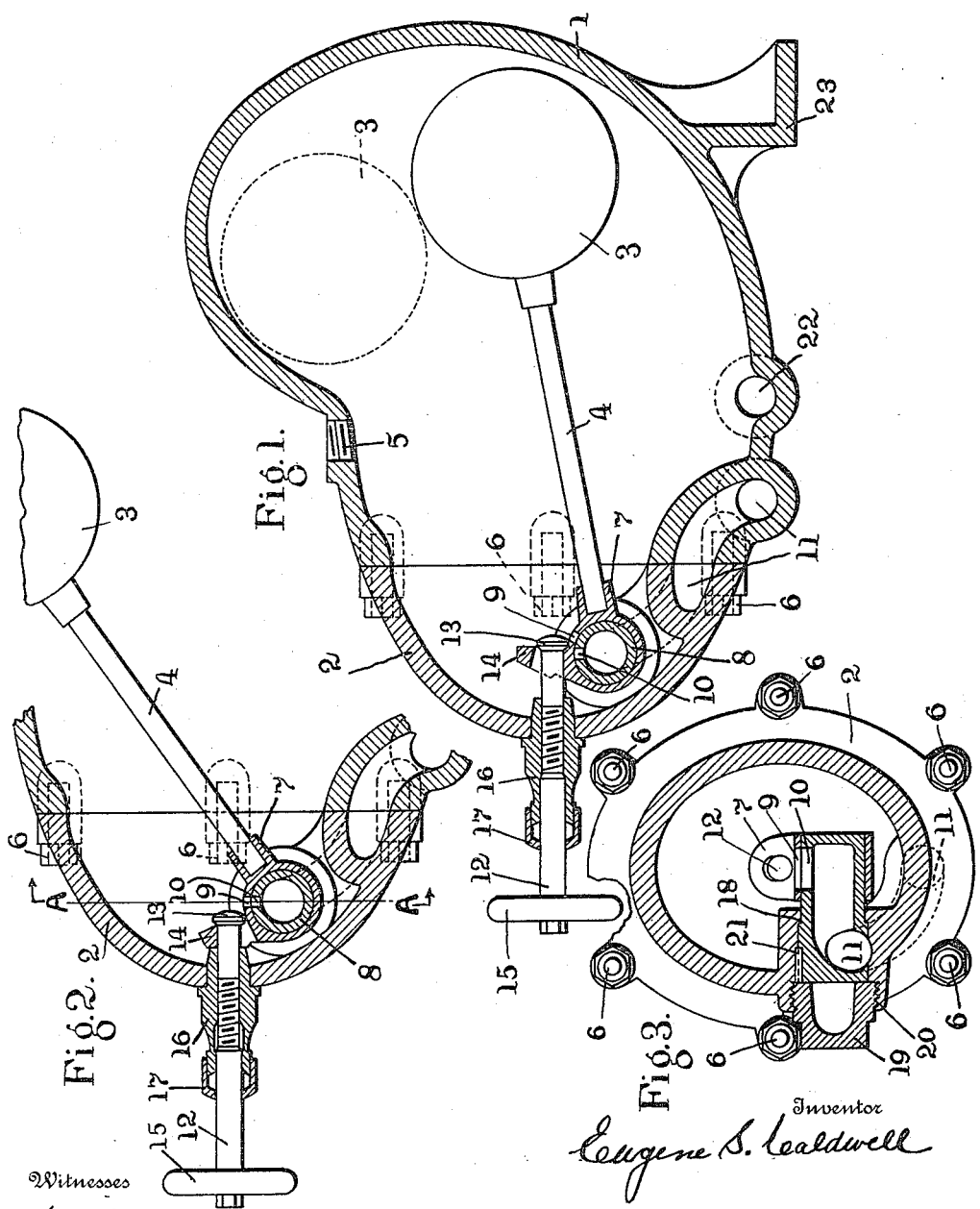

UNITED STATES PATENT OFFICE.

EUGENE S. CALDWELL, OF PHILADELPHIA, PENNSYLVANIA.

STEAM-TRAP.

1,081,431.

Specification of Letters Patent.    Patented Dec. 16, 1913.

Application filed November 5, 1909. Serial No. 526,336.

*To all whom it may concern:*

Be it known that I, EUGENE S. CALDWELL, a citizen of the United States, and a resident of Philadelphia, in the county of Philadelphia and State of Pennsylvania, have invented certain new and useful Improvements in Steam-Traps, of which the following is a specification.

My invention relates to steam traps of the class in which a float controlled valve is employed to govern the escape of the accumulated water of condensation from the trap.

The object of my invention is to produce a cheap, effective, reliable and durable trap of this character and to secure other advantages which will be apparent from the subjoined description taken in connection with the accompanying drawings.

To these various ends my invention consists in the features of construction and organization and combination of parts more particularly hereinafter described and then specified in the claims.

In the drawings, Figure 1 is a vertical section of a trap embodying my invention. Fig. 2 shows in similar sectional view a portion of the apparatus with the parts in a different position. Fig. 3 is a cross-section on the line A A Fig. 2.

Referring to Figs. 1, 2 and 3, 1 designates the body of the casing or chamber in which the water of condensation accumulates and 2 is a detachable cover or head closing an opening in the side of the casing and of sufficient size to permit the ready removal of the float therethrough. The cover 2 is fastened firmly in position to seal the casing by the bolts 6 or equivalent means, and the working parts of the trap are mounted on said cover or head so that upon detachment all the parts will be removed for renewal or repair. The inlet connection for the steam or water of condensation is made at 5 and the outlet connection for the water discharged from the casing by the operation of the valve is made at 11, both said connections being made on the body of the trap so that it will not be necessary to disturb either of them when the head 2 is detached for removing the working parts of the apparatus. Float 3 is shown in Fig. 1 as a closed float. The arm 4 carrying the float is secured to a rotary valve 7 of cylinder type, having the port 9 adapted to register with a port 10 in the valve plug 8, suitably fixed in a dent or socket in a wall of the cover 2. The hollow plug 8 connects with the passage 11 in the head or cover 2, which passage, when the cover is applied, registers or matches with the passage 11 in the body 1, so that when the float is lifted as shown in Fig. 2, water will discharge through the ports 9 and 10 and passages 11 to the outlet or discharge opening. The object of porting back to the body of the trap is to avoid the use of pipe connections to the cover, thereby leaving the cover free to be removed at any time without breaking the pipe connections of the outlet.

22 is an outlet from the body serving as a dirt pocket and for draining the body of the trap when it is out of service to prevent freezing.

12 is a stem or rod extending from the head 2 and having an operating wheel 15 exterior to the cover and a head or projection 13 within the trap which engages in an opening in arm 14 extending radially from the valve. This head or projection 13 so engaging, acts to keep the valve in its proper position upon the plug and further serves as a means of lifting the float, as shown in Fig. 2 when hand wheel 15 is turned, should it be desired to blow off the trap or should the valve become stuck. The stem 12 turns in a stuffing-box 16 attached to the cover in any suitable way and provided with a stuffing box gland 17 to prevent leakage. The valve plug 8 is fixed in position in the cover in the manner shown in Fig. 3, by means of an external jam nut 19 having a screw-thread engagement with the cover at 20 and adapted to force the shoulder of the plug inward against the shoulder in its seat, as indicated at 18. Key 21 is employed to insure the proper position of the plug in its seat so that the port 10 shall be uppermost, and the outlet opening of the plug shall register properly with the passage 11 in the head or cover. The outlet 22 is situated at the extreme bottom of the curve of the casing, as shown, where dirt or sediment collects, thereby permitting the same to be blown out of the trap. Foot 23 acts as a stand with the projections at 11 and 22 on the casing.

What I claim as my invention is:

1. In a steam trap having a trap casing, a valve plug fixed in an opening in a wall of the trap casing, a cylindrical valve turning on said plug, an actuating float connected to said valve, an arm extending radially from the rotary element of the valve and an operating stem having a head engaging said arm.

2. In a steam trap of the float operated type, a hollow valve plug seated in an opening in the trap casing and having an outlet in its side registering with an outlet passage formed in the valve casing, a valve turning around the longitudinal axis of said plug, an external jam nut for holding the plug and a positioning key as and for the purpose described.

3. In a steam trap, the combination with a float, float arm and a rotary valve mounted on the trap cover, of an operating stem extending through the trap cover and engaging the arm to operate the valve and hold the same in place on its seat.

Signed at Philadelphia in the county of Philadelphia and State of Pennsylvania this first day of November A. D. 1909.

EUGENE S. CALDWELL.

Witnesses:
HORACE R. BURKE,
M. C. SISLER.

Copies of this patent may be obtained for five cents each, by addressing the "Commissioner of Patents, Washington, D. C."